US009711967B1

(12) United States Patent
Czarnecki

(10) Patent No.: US 9,711,967 B1
(45) Date of Patent: Jul. 18, 2017

(54) OFF GRID BACKUP INVERTER AUTOMATIC TRANSFER SWITCH

(71) Applicant: Reliance Controls Corporation, Racine, WI (US)

(72) Inventor: Neil A. Czarnecki, Mt. Pleasant, WI (US)

(73) Assignee: Reliance Conrtols Corporation, Racine, WI (US)

( * ) Notice: Subject to any disclaimer, the term of this patent is extended or adjusted under 35 U.S.C. 154(b) by 565 days.

(21) Appl. No.: 14/068,507

(22) Filed: Oct. 31, 2013

Related U.S. Application Data

(60) Provisional application No. 61/722,910, filed on Nov. 6, 2012.

(51) Int. Cl.
*H02J 5/00* (2016.01)

(52) U.S. Cl.
CPC ...................................... *H02J 5/00* (2013.01)

(58) Field of Classification Search
CPC ....................................................... H02J 5/00
USPC ............................................................ 307/82
See application file for complete search history.

(56) References Cited

U.S. PATENT DOCUMENTS

| | | | | |
|---|---|---|---|---|
| 6,737,762 B2* | 5/2004 | Koenig | ................... | H02J 9/062 307/48 |
| 6,949,843 B2* | 9/2005 | Dubovsky | ............... | H02J 3/382 307/64 |
| 8,033,686 B2 | 10/2011 | Recker et al. | | |
| 8,068,352 B2 | 11/2011 | Yu et al. | | |
| 8,710,699 B2* | 4/2014 | Binder | .................... | H02J 3/383 307/64 |
| 8,810,066 B2* | 8/2014 | Moon | ....................... | H02J 3/32 307/65 |
| 9,099,893 B2* | 8/2015 | Schmiegel | .............. | H02J 3/383 |
| 2002/0121298 A1* | 9/2002 | Konold | .................... | F24J 2/085 136/248 |
| 2003/0025397 A1* | 2/2003 | Young | ...................... | H02J 3/32 307/64 |
| 2003/0080622 A1* | 5/2003 | Koenig | .................. | H02J 9/062 307/64 |
| 2004/0066094 A1* | 4/2004 | Suzuki | ..................... | H02J 3/38 307/18 |
| 2008/0067869 A1* | 3/2008 | Evans | ..................... | H02J 3/387 307/11 |
| 2009/0027932 A1* | 1/2009 | Haines | .................... | H02J 9/062 363/95 |

(Continued)

*Primary Examiner* — Jared Fureman
*Assistant Examiner* — Emmanuel R Dominique
(74) *Attorney, Agent, or Firm* — Boyle Fredrickson, S.C.

(57) ABSTRACT

A power conversion system for use with an alternate energy source includes a first inverter, a battery, and a second inverter, each of which receives power from the alternate energy source. The output of the first inverter and the grid are each connected to at least one electrical load via a load center. The battery is charged via a charger connected to the alternate energy source. This stored energy powers a selected portion of the electrical loads during a failure of the utility grid. The second inverter is connected between the battery and a transfer switch. During normal grid operation, the second inverter is disabled and the transfer switch connects the load center to the selected electrical loads. During a failure of the utility grid, the first inverter is disabled, the second inverter is enabled, and the transfer switch connects the second inverter to the selected electrical loads.

10 Claims, 1 Drawing Sheet

(56) References Cited

U.S. PATENT DOCUMENTS

| | | | | |
|---|---|---|---|---|
| 2010/0013308 A1* | 1/2010 | Lathrop | ............... | H02J 3/14 |
| | | | | 307/64 |
| 2011/0088741 A1* | 4/2011 | Dunton | ............ | H01L 31/02021 |
| | | | | 136/244 |
| 2011/0101784 A1* | 5/2011 | Lopez | ............... | H02J 1/10 |
| | | | | 307/80 |
| 2011/0133552 A1* | 6/2011 | Binder | ............... | H02J 3/383 |
| | | | | 307/22 |
| 2011/0273019 A1 | 11/2011 | de Caires | | |
| 2011/0309690 A1 | 12/2011 | West | | |
| 2012/0043889 A1 | 2/2012 | Recker et al. | | |
| 2012/0267957 A1* | 10/2012 | Czarnecki | ............... | H02J 3/02 |
| | | | | 307/64 |
| 2012/0326504 A1* | 12/2012 | Ballantine | ............... | H02J 3/006 |
| | | | | 307/24 |
| 2012/0326668 A1* | 12/2012 | Ballatine | ............... | B60L 11/184 |
| | | | | 320/109 |
| 2013/0187464 A1* | 7/2013 | Smith | ............... | H02S 20/30 |
| | | | | 307/47 |
| 2015/0008737 A1* | 1/2015 | Mao | ............... | H02J 7/007 |
| | | | | 307/22 |

\* cited by examiner

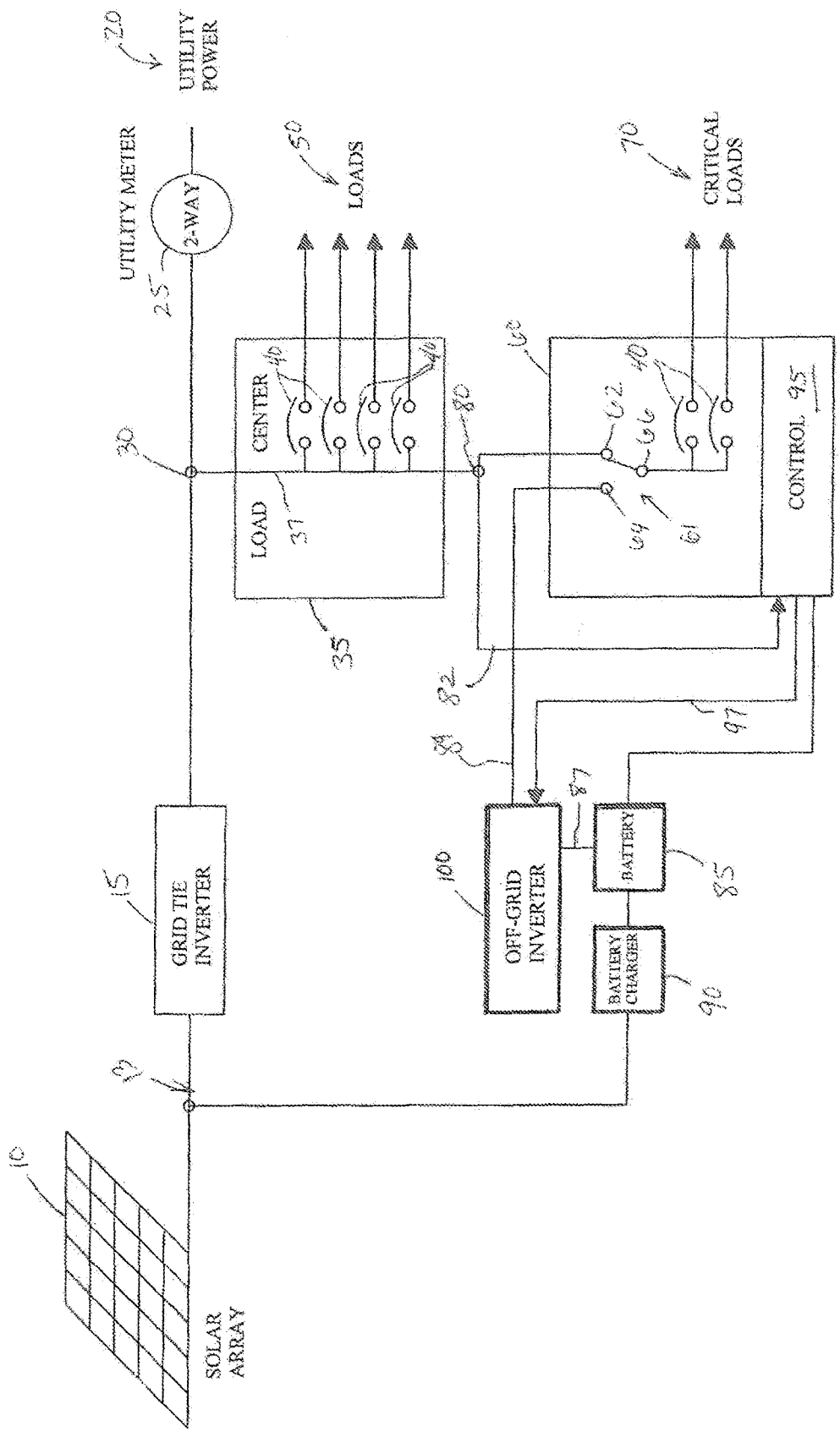

OFF GRID BACKUP INVERTER AUTOMATIC TRANSFER SWITCH

CROSS-REFERENCE TO RELATED APPLICATIONS

This application claims priority to U.S. provisional application Ser. No. 61/722,910, filed Nov. 6, 2012, the entire contents of which is incorporated herein by reference.

BACKGROUND OF THE INVENTION

The subject matter disclosed herein relates to a power conversion system for use with an alternate energy source, and more specifically, to a power conversion system including a first inverter for use in grid-tied operation and a second inverter for use in off-grid operation.

Historically, electrical power has been supplied to a consumer by a utility power grid. However, rising energy costs, environmental concerns, a desire or need for backup energy sources, or a combination thereof have led to an ever increasing base of consumers utilizing alternate energy sources, such as wind turbines or photovoltaic cells, to supply at least a portion of their electricity requirements.

These alternate energy sources are typically connected in parallel with the utility grid such that either energy source may supply energy to the consumer. The utility grid is connected via a bidirectional power meter to an input point at the load center, which distributes electrical energy to the various electrical loads. The alternate energy source is also connected to the load center via a grid-tied inverter. The grid-tied inverter monitors the utility grid and converts the electrical energy generated by the alternate energy source to a voltage in phase with the utility grid. If the energy generated by the alternate energy source exceeds the demands of the loads, then the excess energy is transferred to the utility grid. If the energy generated by the alternate energy source is less than the demands of the loads, then the difference in the amount of energy generated by the alternate energy source and the demand of the loads is supplied by the utility grid. Depending on the generating capacity of the alternate energy source and the consumer's load demands, the alternate energy source may reduce or eliminate energy bills from the utility provider or even cause the utility provider to buy excess generating capacity from the consumer.

In addition, the alternate energy source may be capable of generating energy during periods of power failure in the utility grid. Because the output of the grid-tied inverter and the utility grid are both connected to the input of the load center, the potential exists that electrical power generated from the alternate energy source may be supplied back to the utility grid during a power failure. However, utility crews working to restore the utility power disconnect portions of the grid and expect no power to be present beyond the point of disconnection. The presence of power from an alternate energy source creates a potentially hazardous environment in such circumstances. Consequently, electrical codes typically require that the grid-tied inverters be disabled during a power outage to avoid the potential of unexpected power being present on the utility grid. While disabling the grid-tie inverter prevents potentially hazardous energy transfer from the alternate energy source to the grid, it also prevents the alternate energy source from acting as a backup generator during the outage and reduces the potential energy savings that may be realized from the alternate energy source.

Thus, it would be desirable to provide a power conversion system that both prevents potentially hazardous energy transfer from the alternate energy source to the grid and allows the alternate energy source to provide energy to at least a portion of the consumer's electrical loads during a power outage.

BRIEF DESCRIPTION OF THE INVENTION

The subject matter disclosed herein relates to a power conversion system for use with an alternate energy source. The power conversion system includes a first inverter configured to operate as a grid-tied inverter. During periods of normal grid operation, the grid-tied inverter transfers energy from the alternate energy source to the electrical loads or back to the utility grid according to the amount of energy generated by the alternate source and the amount of energy demanded by the electrical loads. The output of the first inverter and the utility grid are each connected to a load center and, in turn, to the electrical loads via electrical disconnects in the load center.

The power conversion system also includes an energy storage device such as a battery or a bank of batteries. A portion of the energy generated by the alternate energy source is stored in the energy storage device until it has reached its maximum capacity. This stored energy may be used to supplement energy provided by the alternate energy source, providing a more uniform energy supply. In addition, the stored energy may be used to power at least a portion of the electrical loads during a failure of the utility grid.

The power conversion system also includes a second, off-grid inverter. The off-grid inverter is connected between the battery and a transfer switch. The transfer switch is configured to selectively connect energy from the load center (i.e., power generated either from the utility grid or the alternate energy source and transferred via the grid-tied inverter) or from the off-grid inverter to a selected portion of the electrical loads. During normal grid operation, the off-grid inverter is disabled and the transfer switch connects the load center to the selected electrical loads. During a failure of the utility grid, the grid-tied inverter is disabled, the off-grid inverter is enabled, and the transfer switch connects the off-grid inverter to the selected electrical loads.

According to one embodiment of the invention, a power conversion system configured to connect a secondary power source to at least one electrical load either in cooperation with or independent of a utility grid is disclosed. The power conversion system includes a first inverter having an input electrically connected to the secondary power source and an output electrically connected to a power distribution point. The utility grid is also connected to the power distribution point. An energy storage device, such as a battery, is configured to store energy generated by the secondary power source, and a power converter is configured to electrically connect the energy storage device to the secondary power source. A second inverter has an input and an output, where the input is electrically connected to the energy storage device. A transfer switch selectively connects either the power distribution point or the output of the second inverter to the electrical load.

According to another aspect of the invention, the secondary power source generates a DC voltage output and the power converter is a DC-to-DC power converter configured for bidirectional energy transfer between the secondary power source and the energy storage device. A sensor generates a signal corresponding to an operating status of the utility power grid. The transfer switch connects the power distribution point to the electrical load when the utility power grid is operating normally and the second inverter to the electrical load when the utility power grid has failed.

According to another embodiment of the invention, a power backup system configured to allow a secondary power source to provide electrical energy to at least one electrical load during a failure of a utility power grid is disclosed, in which a sensor may be included in the transfer switch. The power backup system includes a sensor generating a signal corresponding to an operating status of the utility power grid, an inverter, and a transfer switch. The inverter includes a first input configured to receive the signal corresponding to the operating status of the utility power grid, a second input configured to receive electrical energy generated by the secondary power source, and an output configured to provide electrical energy when the signal indicates the utility power grid has failed. The transfer switch is configured to selectively connect either a power distribution point or the output of the inverter to the electrical load. The output of the inverter is connected to the electrical load when the utility power grid has failed and the power distribution point is connected when the utility power grid is operating normally. Both the utility power grid and another inverter connected to the secondary power source are operatively connected to the power distribution point.

According to yet another embodiment of the invention, a method of supplying power from a secondary power source to at least one electrical load either in cooperation with or independent of a utility grid is disclosed. A first inverter is connected between the secondary power source and a power distribution point, and the utility grid is operatively connected to the power distribution point. A second inverter is connected between the secondary power source and a transfer switch. A first input of the transfer switch is operatively connected to the power distribution point, a second input of the transfer switch is operatively connected to an output of the second inverter, and the output of the transfer switch is operatively connected to the at least one electrical load. The utility grid is monitored to detect whether it is operating normally or the utility grid has failed. The first input of the transfer switch is connected to the output of the transfer switch when the utility grid is operating normally to supply power from the secondary power source to the electrical load in cooperation with the utility grid. The second input of the transfer switch is connected to the output of the transfer switch when the utility grid has failed to supply power from the secondary power source to the electrical load independent of the utility grid.

According to another aspect of the invention, an energy storage device and a power converter are connected to the output of the secondary power source. The power converter transfers energy from the secondary power source to the energy storage device, and the second inverter is connected to the energy storage device.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

An exemplary embodiment of the subject matter disclosed herein is illustrated in the accompanying drawing in which like reference numerals represent like parts throughout, and in which:

FIG. 1 is a block diagram representation of one embodiment of the present invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

As shown in FIG. 1, an exemplary environment incorporating one embodiment of a power conversion system according to the present invention is illustrated. An electricity consumer is connected to the utility grid 20 via a bidirectional electrical meter 25 at a power distribution point 30. The consumer is, for example, an individual or business and the power distribution point 30 is at a residential or commercial building, respectively. A solar, or photovoltaic, array 10 is provided as an alternate energy source that converts light energy to electrical energy. Optionally, other alternate energy sources including, but not limited to, wind turbines, hydro or fuel cells may be provided as a replacement to or in combination with the solar array 10 to generate electrical energy. A first inverter 15 electrically connects the solar array 10 to the power distribution point 30.

According to the illustrated embodiment, the power distribution point 30 is electrically connected to the load center 35, also known as a service panel or a circuit breaker box. Optionally, the power distribution point 30 may be included within the load center 35. In a typical configuration, each of the power sources 10, 20 supply split-phase power to the consumer. In a split-phase power distribution system, three electrical conductors (e.g., two hot leads and a neutral lead) are configured to provide, for example, either 120V or 240V alternating current (AC) to the consumer. The 120 VAC is present between either of the hot leads and the neutral lead and the 240 VAC is present between the two hot leads. The electrical conductors are connected to busses and/or conductor bars within the load center 35 for distribution to the electrical loads 50. For simplicity, the electrical connection between the power distribution point 30 and each load 50 is represented by a single line 37 connected via an electrical disconnect device 40 including, but not limited to, fuses and circuit breakers.

A portion of the electrical loads 50 may be identified as critical loads 70 and may include, for example, a furnace, a hot water heater, a refrigerator, a sump pump, medical equipment, an air conditioning unit, etc. As illustrated, the busses 37 from the load center 35 are connected to a subpanel 60 and are connected to a first input 62 of a transfer switch 61 contained within that subpanel 60. According to one embodiment of the invention, the transfer switch 61 is an automatic transfer switch 61 and a control circuit 95 selects one of the first input 62 and the second input 64 to be connected to the output 66 of the transfer switch 61. The critical loads 70 are electrically connected to the output 66 of the transfer switch via electrical disconnect devices 40. Although identified as a "critical" load herein, any electrical load may be selected according to the consumer's desire to have it remain operational during a power outage. It is further contemplated that the alternate energy source 10, battery 85 and off-grid inverter 100 may be sized to supply power to all of the electrical loads 50 without deviating from the scope of the invention.

The second input 64 to the transfer switch 61 receives power from the alternate energy source 10 via a second inverter 100 and an energy storage device 85. The second inverter 100 receives power from the energy storage device, such as a battery 85, and converts it to a single-phase or split-phase AC voltage according to the voltage demanded by the critical loads 70. A single hot lead or a pair of hot leads is, therefore, connected from the output 89 of the off-grid inverter 100 to the second input 64 of the automatic transfer switch 61. Optionally, a neutral lead from the off-grid inverter 100 may also be connected to the second input of the automatic transfer switch 61. The transfer switch 61 selectively connects each of the leads from either the off-grid inverter 100 or the load center 35 to the critical loads 70. Thus, although illustrated as a single pole, double throw switch, the transfer switch 61 may be a double or triple pole, double throw switch according to the system requirements. The energy storage device is, in turn, charged from the alternate energy source 10 via a battery charger 90.

In operation, the power conversion system is configured to connect a secondary power source 10 to at least one electrical load 50, 70 either in cooperation with or independent of the utility power source 20. In a first operating mode, the power conversion system is configured to operate in cooperation with the utility power source 20. The grid-tied inverter 15 monitors operation of the utility power source 20 to verify proper operation. A voltage sensor may be provided either external from or internal to the grid-tied inverter 15 to generate a signal corresponding to the voltage present on the utility grid 20. Upon verifying that the utility power source 20 is operating normally, the grid-tied inverter 15 operates to output an alternating current synchronized in phase with the utility grid 20. The output from the grid-tied inverter 15 and the utility power source 20 are each connected to the power distribution point 30. The grid-tied inverter 15 regulates current flow from the secondary power source 10 to the power distribution point 30.

In a second operating mode, the power conversion system is configured to operate independent of the utility power source 20. In this mode, the grid-tied inverter 15 detects a failure in the utility power source 20 based on the signal corresponding to the voltage present on the utility grid 20. When a failure of the utility power source 20 is detected, the grid-tied inverter 15 is disabled such that no energy may be transferred from the secondary power source 10 to the utility power source 20. As discussed in more detail below, the off-grid inverter 100 is subsequently enabled to transfer power from the battery 85 to the portion of electrical loads identified as critical loads 70.

The transfer switch 61 selectively connects the load center 35 or the output 89 of the off-grid inverter 100 to the critical loads 70. The control circuit 95 monitors operation of the utility power source 20, for example, at a point 80 between the load center 35 and the sub panel 60. A sensor generates a signal 82 corresponding to the voltage generated by the utility power source 20 for use by the control circuit 95. It is contemplated that the control circuit 95 may include discrete logic devices, a field programmable gate array (FPGA), an application specific integrated circuit (ASIC), a microprocessor, or a combination thereof and any required supporting circuitry including, but not limited to memory and power supplies. The control circuit 95 may be provided on a separate circuit board or integrated within one of the inverters 15, 100. If the signal 82 corresponding to the voltage generated by the utility power source 20 indicates the utility power source 20 is operating normally, the transfer switch 61 connects the first input 62 to the output 66, connecting the load center 35 to the critical loads 70. If the signal 82 corresponding to the voltage generated by the utility power source 20 indicates the utility power source 20 has failed, the transfer switch 61 connects the second input 64 to the output 66, connecting the output 89 of the off-grid inverter 100 to the critical loads 70.

During normal operation of the utility power source 20, power is provided to all of the electrical loads 50, 70 via the power distribution point 30. The power demand resulting from the electrical loads 50, 70 draws current from one or both of the power sources 10, 20 through the power distribution point 30, the load center 35, and the sub-panel 60 as required. If the power demand is less than the power output from the grid-tied inverter 15, then all of the power to the electrical loads 50, 70 is supplied by the secondary power source 10 via the grid-tied inverter 15. The excess power generated by the secondary power source 10 is transferred to the utility power source 20 via the 2-way meter 25. If the power demand is greater than the power output from the grid-tied inverter 15, then the difference between the power demand and the power output from the grid-tied inverter 15 is supplied by the utility power source 20.

In addition to providing power to the loads 50, 70, a portion of the energy generated by the secondary power source 10 is stored in an energy storage device, such as a battery 85. The battery 85 is connected to the output 13 of the secondary power source 10 via a battery charger 90. Although a battery charger 90 is typically considered a unidirectional power conversion device, it is further contemplated that a bidirectional power conversion device may be used without deviating from the scope of the invention. The battery charger 90 operates to transfer energy from the secondary power source 10 to the battery 85. When the utility power source 20 is operating normally, the battery charger 90 may operate intermittently to maintain a substantially full charge on the battery 85. Optionally, if a bidirectional power conversion device is used, a portion of the energy stored in the battery 85 may be used to supplement the power generated by the secondary power source 10.

During periods in which the utility power source 20 has failed, the off-grid inverter 100 operates to transfer energy stored in the battery 85 to the critical loads 70. According to the illustrated embodiment, the off-grid inverter 100 receives an enable signal 97 from the control circuit 95. Optionally, the off-grid inverter 100 may receive a signal corresponding to the voltage generated by the utility power source 20. The off-grid inverter 100 may then detect a power failure based on this signal and enable operation of the inverter 100 responsive to the power failure. The off-grid inverter 100 receives a DC voltage, VDC, from the battery 85 at its input 87 and converts the DC voltage, VDC, to an AC voltage at its output 89, and the AC voltage is supplied to the critical loads 70 via the transfer switch 61. As the off-grid inverter 100 draws energy from the battery 85, the secondary power source 10 continues to generate energy which is supplied to the battery 85 by the battery charger 90. Thus, the secondary power source 10 may function as a backup energy source during failure of the utility power source 20 by transferring energy through the battery charger 90 to the battery 85 and, subsequently, through the off-grid inverter 100 to selected loads 70. When the control circuit 95 detects normal operation of the utility power source 20 return, it disables the off-grid inverter 100 by removing the enable command 97 and switches the transfer switch 61 back to the first input 62, reconnecting the critical loads 70 to the utility power source 20. The grid-tied inverter 15 is, in turn, re-enabled, allowing energy generated by the alternate power source 10 to also be supplied to the loads 50, 70 via electrical connections in the load center 35 and the first input 62 of the transfer switch 61.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A power conversion system configured to connect a secondary power source to at least one electrical load either in cooperation with or independent of a utility grid, the power conversion system comprising:
   a first inverter having:
      an input electrically connected to the secondary power source,
      an output electrically connected to a power distribution point, wherein the utility grid is also connected to the power distribution point, and
      a sensor generating a signal corresponding to a voltage present on the utility grid, wherein the first inverter is enabled when the signal indicates the utility grid is operating normally and the first inverter is disabled when the signal indicates the utility grid has failed, wherein when the first inverter is disabled, the secondary power source is electrically isolated from the utility grid;
   an energy storage device configured to store energy generated by the secondary power source;
   a power converter having an input electrically connected to the secondary power source and an output electrically connected to a terminal of the energy storage device, wherein the power converter provides power to the energy storage device from the secondary power source;
   a second inverter having an input electrically connected to the terminal of the energy storage device and an output; and
   a transfer switch selectively connecting one of the power distribution point and the output of the second inverter to the at least one electrical load.

2. The power conversion system of claim 1 wherein the energy storage device includes at least one battery.

3. The power conversion system of claim 1 wherein the secondary power source generates a DC voltage output and the power converter is a DC-to-DC power converter configured for bidirectional energy transfer between the secondary power source and the energy storage device.

4. The power conversion system of claim 1 wherein the sensor in the first inverter is a first sensor, the power conversion system further comprising a second sensor generating a signal corresponding to an operating status of the utility grid, wherein the transfer switch connects the power distribution point to the at least one electrical load when the signal from the second sensor indicates the utility grid is operating normally and the transfer switch connects the output of the second inverter to the at least one electrical load when the signal from the second sensor indicates the utility grid has failed.

5. The power conversion system of claim 4 wherein the second sensor is included in the transfer switch.

6. The power conversion system of claim 4 wherein the signal from the second sensor enables the second inverter when the sensor indicates the utility grid has failed and disables the second inverter when the sensor indicates the utility grid is operating normally.

7. A power backup system configured to allow a secondary power source to provide electrical energy to at least one electrical load during a failure of a utility power grid, the power backup system comprising:
   an energy storage device configured to store energy generated by the secondary power source;
   a power converter having an input electrically connected to the secondary power source and an output electrically connected to a terminal of the energy storage device, wherein the power converter provides power to the energy storage device from the secondary power source;
   a sensor generating a signal corresponding to an operating status of the utility power grid;
   an off-grid inverter, including:
      a first input configured to receive the signal corresponding to the operating status of the utility power grid,
      a second input electrically connected to the terminal of the energy storage device, and
      an output configured to provide electrical energy when the signal indicates the utility power grid has failed; and
   a transfer switch configured to selectively connect one of a power distribution point and the output of the inverter to the at least one electrical load, wherein the output of the inverter is connected to the at least one electrical load when the utility power grid has failed and the power distribution point is connected when the utility power grid is operating normally and wherein both the utility power grid and another inverter connected to the secondary power source are operatively connected to the power distribution point.

8. The power backup system of claim 7 wherein the energy storage device includes at least one battery.

9. The power backup system of claim 7 wherein the sensor is included in the transfer switch.

10. A method of supplying power from a secondary power source to at least one electrical load either in cooperation with or independent of a utility grid, the method comprising the steps of:
   connecting a first inverter between the secondary power source and a power distribution point, wherein the utility grid is operatively connected to the power distribution point;

connecting a second inverter between an energy storage device charged by the secondary power source and a transfer switch, wherein a first input of the transfer switch is operatively connected to the power distribution point, a second input of the transfer switch is operatively connected to an output of the second inverter, and an output of the transfer switch is operatively connected to the at least one electrical load, and wherein the second inverter and the energy storage device are each electrically isolated from the utility grid when the utility grid has failed;

sensing whether the utility grid is operating normally or the utility grid has failed;

connecting the first input of the transfer switch to the output of the transfer switch when the utility grid is operating normally to supply power from the secondary power source to the at least one electrical load in cooperation with the utility grid; and connecting the second input of the transfer switch to the output of the transfer switch when the utility grid has failed to supply power from the energy storage device to the at least one electrical load independent of the utility grid.

\* \* \* \* \*